(12) United States Patent
Barnett et al.

(10) Patent No.: US 12,508,781 B2
(45) Date of Patent: Dec. 30, 2025

(54) METHOD OF MANUFACTURING AIRCRAFT AEROFOIL

(71) Applicant: AIRBUS OPERATIONS LIMITED, Bristol (GB)

(72) Inventors: Thomas Barnett, Bristol (GB); Lee Proudler, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 189 days.

(21) Appl. No.: 18/249,010

(22) PCT Filed: Oct. 7, 2021

(86) PCT No.: PCT/GB2021/052603
§ 371 (c)(1),
(2) Date: Apr. 13, 2023

(87) PCT Pub. No.: WO2022/079415
PCT Pub. Date: Apr. 21, 2022

(65) Prior Publication Data
US 2023/0382061 A1 Nov. 30, 2023

(30) Foreign Application Priority Data
Oct. 16, 2020 (GB) ..................................... 2016392

(51) Int. Cl.
*B29C 70/30* (2006.01)
*B64F 5/10* (2017.01)
(Continued)

(52) U.S. Cl.
CPC .............. *B29C 70/302* (2021.05); *B64F 5/10* (2017.01); *B29L 2031/3085* (2013.01); *B64C 3/26* (2013.01); *B64C 23/069* (2017.05)

(58) Field of Classification Search
CPC ........................... B29L 2031/3085; B64F 5/10
See application file for complete search history.

(56) References Cited

U.S. PATENT DOCUMENTS 4,657,615 A * 4/1987 Braun ..................... B64C 3/185
156/173
4,786,343 A * 11/1988 Hertzberg ................ C08J 5/124
156/92

(Continued)

FOREIGN PATENT DOCUMENTS

EP 2 105 579 9/2009
EP 2 602 097 6/2013
(Continued)

OTHER PUBLICATIONS

International Search Report and Written Opinion of the ISA for PCT/GB2021/052603 dated Jan. 28, 2022, 11 pages.
(Continued)

*Primary Examiner* — Jeffry H Aftergut
(74) *Attorney, Agent, or Firm* — Nixon & Vanderhye P.C.

(57) ABSTRACT

A method of manufacturing an aircraft aerofoil such as a winglet. The aircraft aerofoil includes: a first cover, a second cover, an aerofoil leading edge, and an aerofoil trailing edge where the first and second cover are joined at a trailing edge interface. The first cover is formed by: a lay-up step in which a plurality of fibre plies are laid up to obtain a preform, wherein the preform has a thickness and a preform trailing edge, and the preform is laid up during the lay-up step with a ramp of decreasing thickness where the thickness of the preform decreases towards the preform trailing edge; and a curing step in which the preform is cured to form the first cover, wherein the ramp of decreasing thickness cures during the curing step to form a contact surface of the first cover.

13 Claims, 7 Drawing Sheets

(51) Int. Cl.
 *B29L 31/30* (2006.01)
 *B64C 3/26* (2006.01)
 *B64C 23/06* (2006.01)

(56) References Cited

U.S. PATENT DOCUMENTS

2011/0103962 A1    5/2011   Hayden et al.
2013/0312900 A1   11/2013   Austinat et al.
2015/0316028 A1   11/2015   Brekenfeld
2017/0043859 A1*   2/2017   Autry ................. B64C 3/26
2018/0080432 A1    3/2018   Bendel et al.
2018/0093431 A1*   4/2018   Forston ............... B32B 5/26

FOREIGN PATENT DOCUMENTS

EP        3 210 883       8/2017
EP        3210883 A1 *   8/2017
WO    2017/027087     2/2017

OTHER PUBLICATIONS

Combined Search and Examination Report for GB2016392.9, dated Apr. 12, 2021, 7 pages.

* cited by examiner

METHOD OF MANUFACTURING AIRCRAFT AEROFOIL

This application is the U.S. national phase of International Application PCT/GB2021/052603, filed Oct. 7, 2021, which designated the U.S. and claims priority to United Kingdom patent application GB 2016392.9, filed Oct. 16, 2020, the entire contents of each of which are hereby incorporated by reference.

FIELD OF THE INVENTION

The present invention relates to an aircraft aerofoil, and a method of manufacturing an aircraft aerofoil.

BACKGROUND OF THE INVENTION

Aircraft aerofoils, such as wings or winglets, may be formed from a first cover, a second cover, an aerofoil leading edge, and an aerofoil trailing edge. The second cover is joined to the first cover at a trailing edge interface.

One of the covers may be machined away to achieve the correct profile at the trailing edge interface. This machining operation is costly, takes time and results in wastage.

SUMMARY OF THE INVENTION

A first aspect of the invention provides a method of manufacturing an aircraft aerofoil, the aircraft aerofoil comprising: a first cover, a second cover, an aerofoil leading edge, and an aerofoil trailing edge where the first and second cover are joined at a trailing edge interface, the method comprising: forming the first cover by: a lay-up step in which a plurality of fibre plies are laid up to obtain a preform, wherein the preform has a thickness and a preform trailing edge, and the preform is laid up during the lay-up step with a ramp of decreasing thickness where the thickness of the preform decreases towards the preform trailing edge; and a curing step in which the preform is cured to form the first cover, wherein the ramp of decreasing thickness cures during the curing step to form a contact surface of the first cover and wherein the preform is cured in contact with a mould during the curing step, the mould contacting the ramp of decreasing thickness during the curing step; assembling the trailing edge interface by engaging the contact surface of the first cover with a contact surface of the second cover; and joining the second cover to the first cover at the trailing edge interface.

Optionally the fibre plies are terminated in a staggered fashion at the ramp of decreasing thickness.

Optionally the ramp of decreasing thickness comprises a stack of the fibre plies, and a cover fibre ply which covers the stack of the fibre plies and cures to form the contact surface of the first cover.

Optionally the cover ply extends to the preform trailing edge.

Optionally the preform is laid up in the lay-up step with a skin region and an interface region, the interface region comprising: a ramp of increasing thickness where the thickness of the preform increases towards the first cover trailing edge; the ramp of decreasing thickness where the thickness of the preform decreases towards the first cover trailing edge; and an apex between the ramp of increasing thickness and the ramp of decreasing thickness.

Optionally the joining step comprises inserting a fastener through the contact surfaces of the first and second covers.

Optionally the aircraft aerofoil is a winglet.

Optionally the plurality of fibre plies are dry-fibre plies; and the method further comprises, between the lay-up step and the curing step, an impregnating step in which the dry-fibre plies are impregnated with a matrix.

Optionally the first cover is a lower cover and the second cover is an upper cover.

Optionally the method further comprises: forming the second cover by: a lay-up step in which a plurality of fibre plies are laid up to obtain a second preform, wherein the second preform has a thickness and a second preform trailing edge, and the second preform is laid up during the lay-up step with a second ramp of decreasing thickness where the thickness of the second preform decreases towards the second preform trailing edge; and a curing step in which the second preform is cured to form the second cover, wherein the second ramp of decreasing thickness cures during the curing step to form the contact surface of the second cover.

Optionally, the second preform is cured in contact with a second mould during the curing step, the second mould contacting the second ramp of decreasing thickness during the curing step.

Optionally the second preform is laid up in the lay-up step with a skin region and an interface region, the interface region comprising: a second ramp of increasing thickness where the thickness of the second preform increases towards the second preform trailing edge; the second ramp of decreasing thickness where the thickness of the second preform decreases towards the second preform trailing edge; and an apex between the second ramp of increasing thickness and the second ramp of decreasing thickness.

A further aspect of the invention provides an aircraft aerofoil comprising: a first cover; a second cover; an aerofoil leading edge, and an aerofoil trailing edge where the first and second cover are joined at a trailing edge interface, wherein: the first cover comprises a thickness, a first cover trailing edge, a skin region and a first interface region, the first interface region comprising a first ramp of increasing thickness where the thickness of the first cover increases towards the first cover trailing edge, a first ramp of decreasing thickness where the thickness of the first cover decreases towards the first cover trailing edge and an apex between the first ramp of increasing thickness and the first ramp of decreasing thickness, wherein the first ramp of decreasing thickness forms a first contact surface of the first cover; the first interface region comprises a first stack of plies of fibre-composite material; the second cover comprises a thickness, a second cover trailing edge, a skin region and a second interface region, the second interface region comprising a second ramp of increasing thickness where the thickness of the second cover increases towards the second cover trailing edge, a second ramp of decreasing thickness where the thickness of the second cover decreases towards the second cover trailing edge and an apex between the second ramp of increasing thickness and the second ramp of decreasing thickness, wherein the second ramp of decreasing thickness forms a second contact surface of the second cover; the second interface region comprises a second stack of plies of fibre-composite material; and the second contact surface of the second cover engages the first contact surface of the first cover at the trailing edge interface.

Optionally the aerofoil further comprises: a first cover ply of fibre-composite material which covers the first stack of plies of fibre-composite material, wherein the first cover ply forms the first contact surface of the first cover; and a second cover ply of fibre-composite material which covers the second stack of plies of fibre-composite material, wherein the second cover ply forms the second contact surface of the second cover.

Optionally the first cover ply extends to the first cover trailing edge and/or the second cover ply extends to the second cover trailing edge.

Optionally the aircraft aerofoil comprises a fastener which joins the first and second covers at the trailing edge interface and passes through the contact surfaces.

A further aspect of the present invention provides a method of manufacturing an aircraft aerofoil, the aircraft aerofoil comprising: a first cover, a second cover, an aerofoil leading edge, and an aerofoil trailing edge where the first and second cover are joined at a trailing edge interface, the method comprising: forming the first cover by: a lay-up step in which a plurality of fibre plies are laid up to obtain a first preform, wherein the first preform has a thickness and a first preform trailing edge, and the first preform is laid up during the lay-up step with a skin region and a first interface region, the first interface region comprising a first ramp of increasing thickness where the thickness of the first preform increases towards the first preform trailing edge, a first ramp of decreasing thickness where the thickness of the first preform decreases towards the first preform trailing edge and an apex between the first ramp of increasing thickness and the first ramp of decreasing thickness; forming the second cover by: a lay-up step in which a plurality of fibre plies are laid up to obtain a second preform, wherein the second preform has a thickness and a second preform trailing edge, and the second preform is laid up during the lay-up step with a skin region and a second interface region, the second interface region comprising a second ramp of increasing thickness where the thickness of the second preform increases towards the second cover trailing edge, a second ramp of decreasing thickness where the thickness of the second preform decreases towards the second preform trailing edge and an apex between the second ramp of increasing thickness and the second ramp of decreasing thickness; wherein the first and second preforms are cured to form the first and second covers, the ramps of decreasing thickness curing to form respective contact surfaces of the first and second covers; assembling the trailing edge interface by engaging the contact surface of the first cover with the contact surface of the second cover; and joining the second cover to the first cover at the trailing edge interface.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
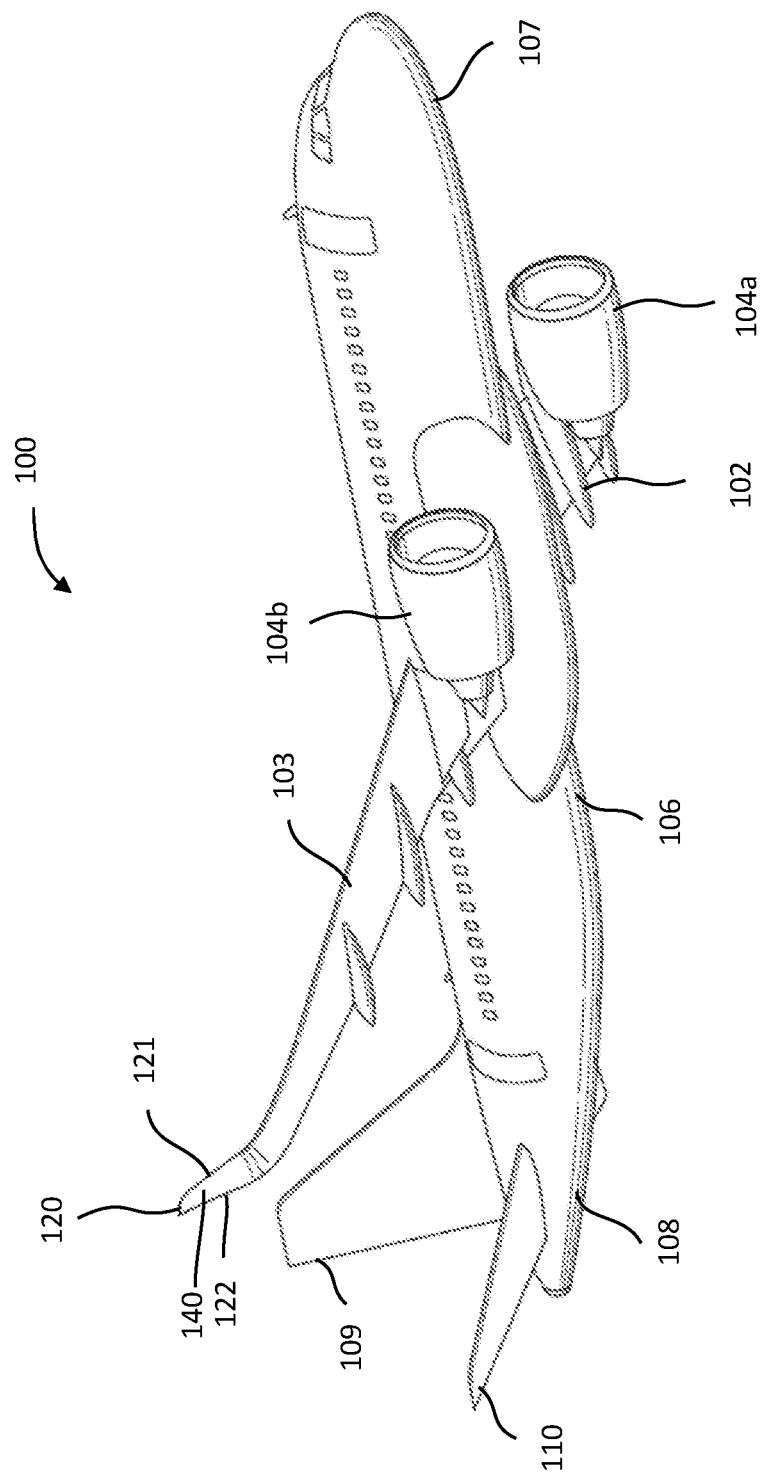
FIG. 1 is a perspective view of an aircraft schematically illustrating one potential application of an aerofoil manufactured according to an embodiment of the present invention.

FIG. 1 illustrates a fixed wing aircraft 100 with a port wing 102 and a starboard wing 103 carrying engines 104a, 104b on pylons.

Each wing 102, 103 of the aircraft 100 has a cantilevered structure with a length extending in a span-wise direction from a root to a tip, the root being joined to an aircraft fuselage 106. The fuselage 106 has a nose 107 and a tail 108, which forms the empennage of the aircraft 100, where respective horizontal and vertical stabilisers 109, 110 of the aircraft 100 are located.

The tip of each wing 102, 103 (distal from the fuselage 106) carries a respective wing tip device in the form of a winglet.

Each winglet has a respective root end where the winglet is connected to the wing. Each winglet also has a tip located at an opposite end of the winglet distal from the port and starboard wings.

The starboard winglet 120 has a first (lower) cover 140, a second (upper) cover 130, a leading edge 121, and a trailing edge 122. The port winglet (not shown) is a mirror image so will not be described.

Figure 2:
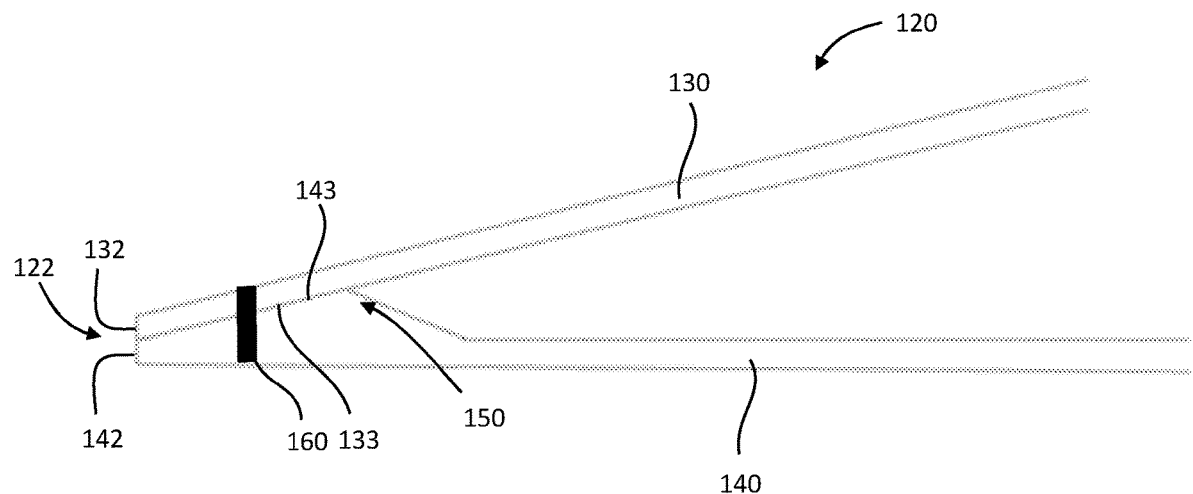
FIG. 2 is a schematic chord-wise sectional view of the trailing edge of a winglet.

The upper cover 130 is not visible in FIG. 1, but shown in FIG. 2 which is a chord-wise cross-section showing the trailing edge 122 of the winglet 120.

The upper cover 130 and lower cover 140 each extend to a respective cover trailing edge. The first (lower) cover 140 has a first cover leading edge 142, and the second (upper) cover 130 has a second cover leading edge 132. The covers 130, 140 are joined together as shown in FIG. 2 at a trailing edge interface 150 at the trailing edge 122 of the winglet 120. Each cover has a respective contact surface 133, 143 which runs up to a respective cover leading edge. The contact surfaces 133, 143 are of complementary shape to one another, and the contact surface 143 of the first (lower) cover 140 engages or abuts the contact surface 133 of the second (upper) cover at the trailing edge interface 150.

In the illustrated embodiments, the upper cover 130 and lower cover 140 are each made of a carbon fibre reinforced composite material (as will be described in greater detail below). However, in alternative embodiments, it will be appreciated that the upper and lower covers may comprise different composite materials, such as glass or aramid fibre reinforced composite materials.

The contact surface 143 of the lower cover is joined to the contact surface 133 of the upper cover by fasteners 160 which pass through the thickness of the upper cover 130, through the trailing edge interface 150, and through the thickness of the lower cover 140. Only one of the fasteners 160 is shown in the plane of the cross-section of FIG. 2: further similar fasteners are distributed along the span of the trailing edge.

In the embodiment illustrated in FIG. 2, the fastener 160 is a bolt. However, other types of fastener may be used. In some embodiments the fasteners may be omitted. For example, in some embodiments the upper and lower covers may be joined at the interface 150 by an adhesive.

It will also be appreciated that whilst the illustrated embodiment shows an aircraft winglet 120, the present invention is also equally applicable to other aircraft aerofoils, such as aircraft flaps, wings and spoilers.

Figure 3:
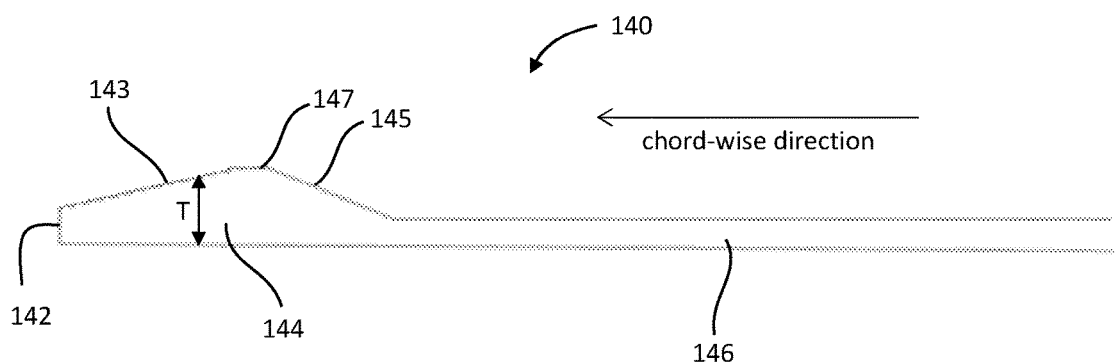
FIG. 3 is a schematic chord-wise sectional view of the trailing edge of a lower cover of the winglet of FIG. 2.

The lower cover 140 is shown in FIG. 3. A thickened interface region 144 is provided adjacent to the first cover trailing edge 142, and this interface region 144 provides the contact surface 143. The lower cover 140 also has a skin region 146, which in this example has constant thickness, although its thickness may vary slightly in the spanwise and/or chordwise direction.

The lower cover 140 has a thickness (T). The interface region 144 comprises a ramp 145 of increasing thickness where the thickness of the cover increases in the chordwise direction towards the first cover trailing edge 142 up to an apex 147; and a ramp of decreasing thickness where the thickness of the cover decreases in the chordwise direction from the apex 147 towards the first cover trailing edge 142. The ramp of decreasing thickness forms the contact surface 143 of the first cover. The apex 147 may be flat and relatively broad in the chord-wise direction, or it may be relatively sharp.

The interface region 144 is thicker than the skin region 146. This enables the interface region 144 to accommodate the fasteners 160 whilst keeping the overall weight of the cover down.

Figure 4A:
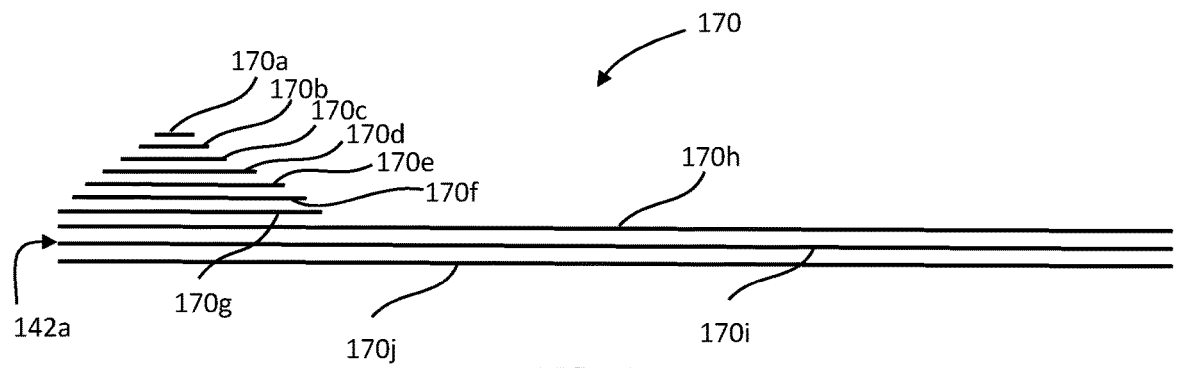
FIGS. 4A and 4B are schematic sectional views of the trailing edge of a preform.
Figure 4B:
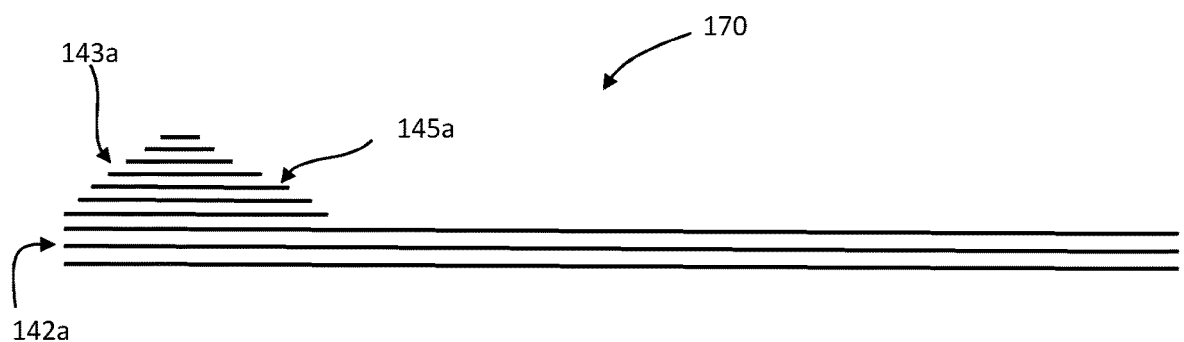

The lower cover 140 is manufactured from a preform 170 comprising a plurality of fibre plies 170a-j shown in FIGS. 4A and 4B. The preform 170 has a thickness and a preform trailing edge 142a.

The interface region 144 is formed by laying-up a stack of fibre plies 170a-g. The plies 170a-g are terminated in a staggered fashion to form a ramp 145a of increasing thickness where the thickness of the preform increases in the chordwise direction towards the preform trailing edge 142a; and a ramp 143a of decreasing thickness where the thickness of the preform decreases in the chordwise direction towards the preform trailing edge 142a. The ramp 145a of increasing thickness cures to form the ramp 145 of the cover 140; and the ramp 143a of decreasing thickness cures to form the ramp and contact surface 143 of the cover 140.

In the illustrated embodiment, the plies 170a-j are laid-up as dry-fibre plies. However, in other embodiments, it will be appreciated that the plies may be laid up as pre-pregs (that is, fibre plies pre-impregnated with a matrix such as an epoxy resin).

The lay-up of plies at the interface region 144 is controlled so that the contact surface 143 of the lower cover 140 has a complementary shape to the contact surface 133 of the upper cover 130. This ensures that the lower cover 140 forms a substantially flush engagement with the upper cover 130 on assembly of the winglet 120.

Figure 4C:
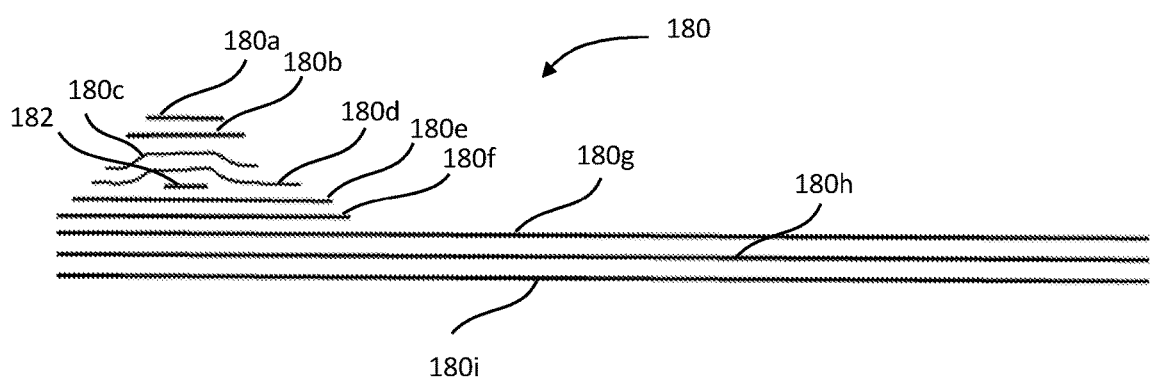
FIG. 4C is a schematic sectional view of the trailing edge of a preform with an insert.

Whilst in FIG. 4A the thickness of the cover 140 is increased by laying up an increased number of plies in a staggered arrangement (i.e. by laying up a number of plies with a steadily decreasing chord-wise length one on top of the other), in alternative embodiments, such as the preform 180 illustrated in FIG. 4C, the thickness of the cover 140 may be increased by inserting one or more insert fibre plies 182 mid-way into the stack 180a-f.

Figure 4D:
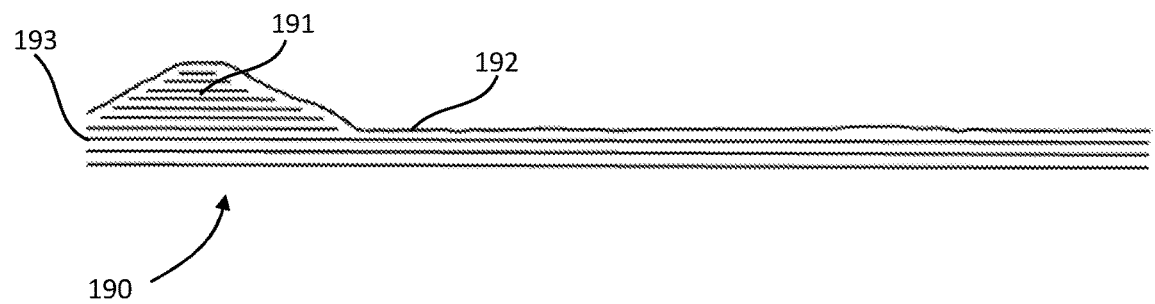
FIG. 4D is a schematic sectional view of the trailing edge of a preform with a cover ply.
Figure 5:
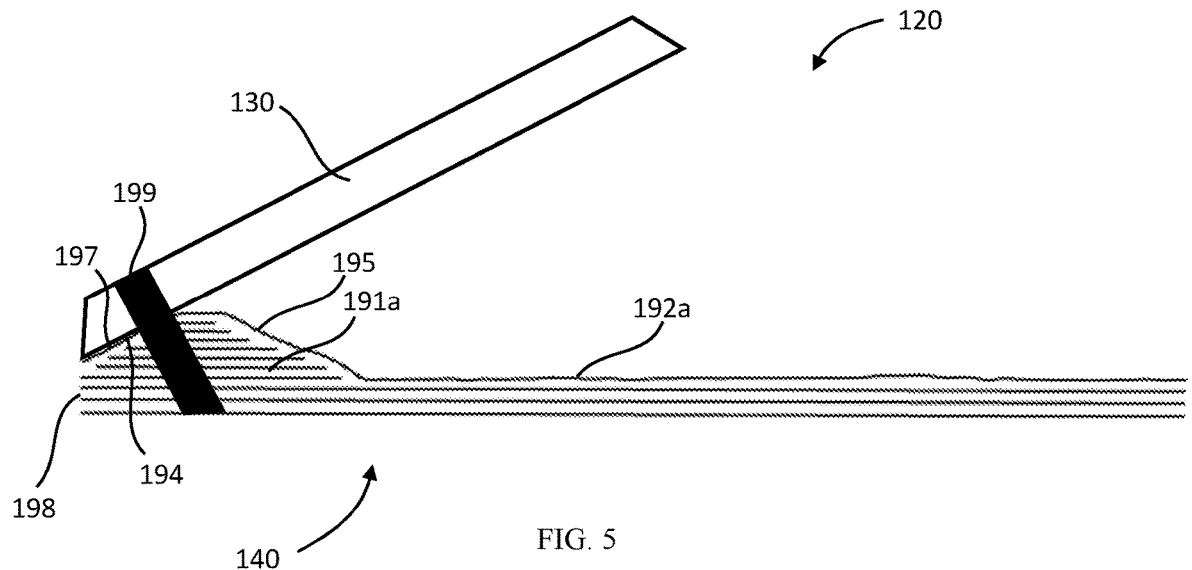
FIG. 5 is a schematic chord-wise sectional view of the trailing edge of an aerofoil with a lower cover manufactured using the preform of FIG. 4D.

Furthermore, in some embodiments, the lower cover may be manufactured from a preform 190 shown in FIG. 4D. The preform 190 comprises a stack 191 of fibre plies (dry-fibre or pre-preg), and a cover ply 192 which covers the stack 191 and runs up and down the first and second ramps to the preform trailing edge 193. In this example there is only one cover ply 192 in the preform, but in other embodiments the preform may have further similar cover plies stacked on top of each other, which also cover the stack 191 of fibre plies FIG. 5 shows the preform 190 after it has been cured to form the first cover 140 and joined to the second cover 130 to form an aircraft aerofoil trailing edge, in this case the trailing edge of the winglet 120.

The first cover 140 has a ramp 145 where the thickness of the first cover increases towards the first cover trailing edge 142; and a ramp 143 where the thickness of the first cover decreases towards the first cover trailing edge 142. The ramp 143 comprises a stack 191a of plies of fibre-composite material (formed from the stack 191 of fibre plies in the preform 190) and a cover ply 192a of fibre-composite material (formed from the cover ply 192 in the preform 190) which covers the stack 191a. The cover ply 192a forms the first contact surface of the first cover 140, which engages the second contact surface 133 of the second cover 130 at the trailing edge interface. The contact surfaces are joined by fasteners 199.

The cover ply 192a helps to provide the cover 140 with a smooth and continuous surface. In this example, only a single cover ply 192a is shown, but in other embodiments the stacks 191, 191a may be covered by multiple cover plies. In this case the outermost cover ply provides the contact surface.

In this embodiment the cover ply 192 extends to the preform trailing edge 193, but in other embodiments it may not extend all the way to the preform trailing edge.

In the embodiments described above, the lower cover 140 has a skin region and a thickened interface region. In other embodiments, the lower cover 140 may not have such a thickened interface region, but instead the skin may lead directly into a ramp of decreasing thickness with no ramp of increasing thickness.

In the illustrated embodiments, a thickened interface region is provided in only the lower cover 140, and the upper cover 130 has a uniform thickness. In other embodiments, this arrangement can be reversed: i.e. with the first and second ramps provided in the upper cover 130, and the lower cover 140 provided with a uniform thickness at the trailing edge.

In the illustrated embodiments, the lower cover 140 has a ramp of decreasing thickness which forms its contact surface, and the upper cover 130 has a uniform thickness. In other embodiments this may be reversed: the upper cover 130 may have a ramp of decreasing thickness which forms its contact surface, and the lower cover 140 may have a uniform thickness.

In other embodiments, both covers may have corresponding thickened interface regions at the trailing edge interface. An embodiment of this type is illustrated in FIGS. 6A and 6B, in which both the upper cover 130 and the lower cover 140 are provided with corresponding thickened interface regions 244, 144.

It has been found that by providing thickened interface regions on both upper and lower covers, the amount of ply ramping required for a given cover is reduced since, instead of providing one very thick cover which requires a significant amount of ramping in order to form the thickened interface region, the amount of ply ramping can be shared between two, less thick, covers whilst still achieving the same overall thickness at the trailing edge interface in the assembled aerofoil. As such, the impact of ply ramping in the finished cover can be reduced.

Figure 6A:
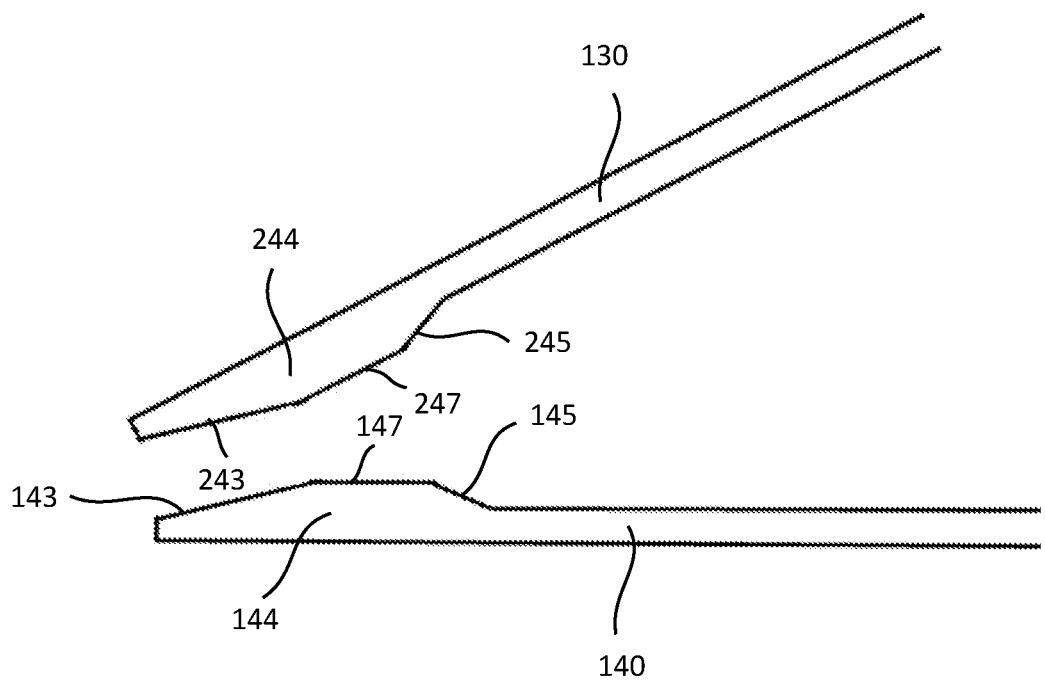
FIG. 6A is a schematic sectional view of the trailing edges of an upper and lower cover which both have thickened interface regions.
Figure 6B:
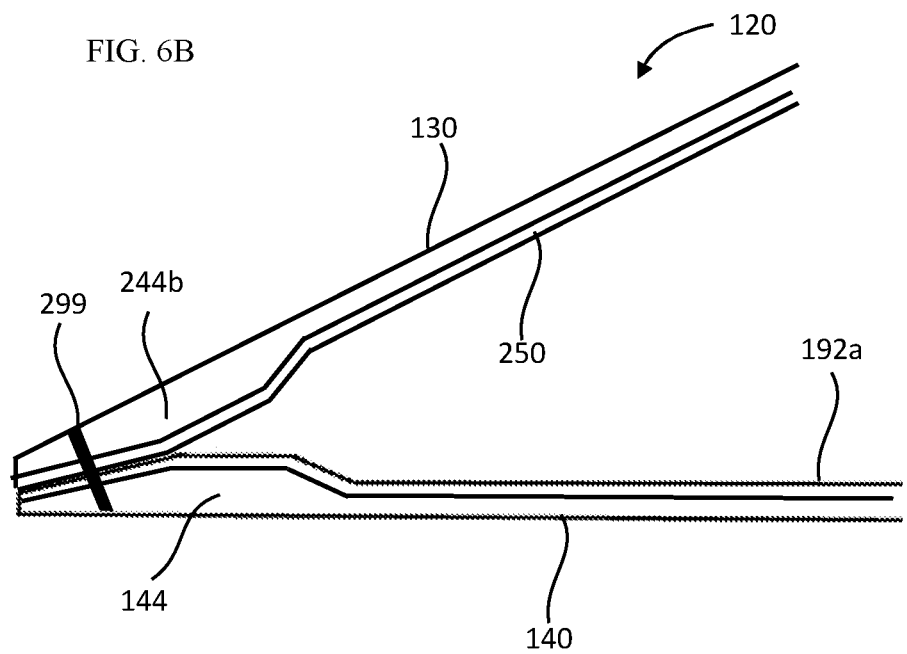
FIG. 6B is a schematic sectional view of the trailing edge of a winglet formed by the covers of FIG. 6A.

The first (lower) cover 140 and the second (upper) cover 130 illustrated in FIG. 6B are formed in the same way as has been described above for the covers shown in FIGS. 4 and 5, by laying up and curing respective first and second preforms, optionally with cover plies.

FIG. 6A shows the covers 130, 140 after they have been cured and before they have been joined together. The covers 130, 14 optionally have cover plies which are not shown in FIG. 6A for simplicity of illustration.

The first (lower) cover 140 is identical to the cover 140 shown in FIG. 3 and with a thickened first interface region 144 with first ramps 143, 145 and an apex 147. The first (lower) cover 140 may be manufactured from a first preform using one of the methods described above in FIGS. 4A-4D.

The second (upper) cover 130 has a similar shape, with a thickened interface region 244 with second ramps 243, 245 and an apex 247. The second (upper) cover 130 may be manufactured from a second preform using one of the methods described above in FIGS. 4A-4D.

The first and second covers 140, 130 are joined to form an aircraft aerofoil, in this case the winglet 120, comprising an aerofoil trailing edge where the first and second covers are joined at a trailing edge interface as shown in FIG. 6B.

The first cover 140 comprises a thickness, a first cover trailing edge, a skin region and a first interface region 144. The first interface region 144 comprises a first ramp 145 of increasing thickness where the thickness of the first cover increases towards the first cover trailing edge, a first ramp 143 of decreasing thickness where the thickness of the first cover decreases towards the first cover trailing edge and an apex 147 between the first ramp of increasing thickness and the first ramp of decreasing thickness. The first ramp 143 of decreasing thickness forms a first contact surface of the first cover 140.

The first interface region 144 comprises a first stack of plies of fibre-composite material. Optionally a first cover ply 192a of fibre-composite material covers the first stack of plies of fibre-composite material. In this case the first cover ply 192a forms the first contact surface of the first cover 140, and extends to the first cover trailing edge.

The second cover 130 comprises a thickness, a second cover trailing edge, a skin region and a second interface region 244. The second interface region 244 comprises a second ramp 245 of increasing thickness where the thickness of the second cover increases towards the second cover trailing edge, a second ramp 243 of decreasing thickness where the thickness of the second cover decreases towards the second cover trailing edge and an apex 247 between the second ramp of increasing thickness and the second ramp of decreasing thickness. The second ramp 243 of decreasing thickness forms a second contact surface of the second cover.

The second interface region 244 comprises a second stack of plies of fibre-composite material. Optionally a second cover ply 250 of fibre-composite material covers the second stack of plies of fibre-composite material as shown in FIG. 6B. In this case the second cover ply 250 forms the second contact surface of the second cover 130, and extends to the second cover trailing edge.

As shown in FIG. 6B, the second contact surface 243 of the second cover 130 engages the first contact surface 143 of the first cover 140 at the trailing edge interface. The first and second covers are joined at the trailing edge interface by fasteners 299 passing through the contact surfaces.

Figure 7:
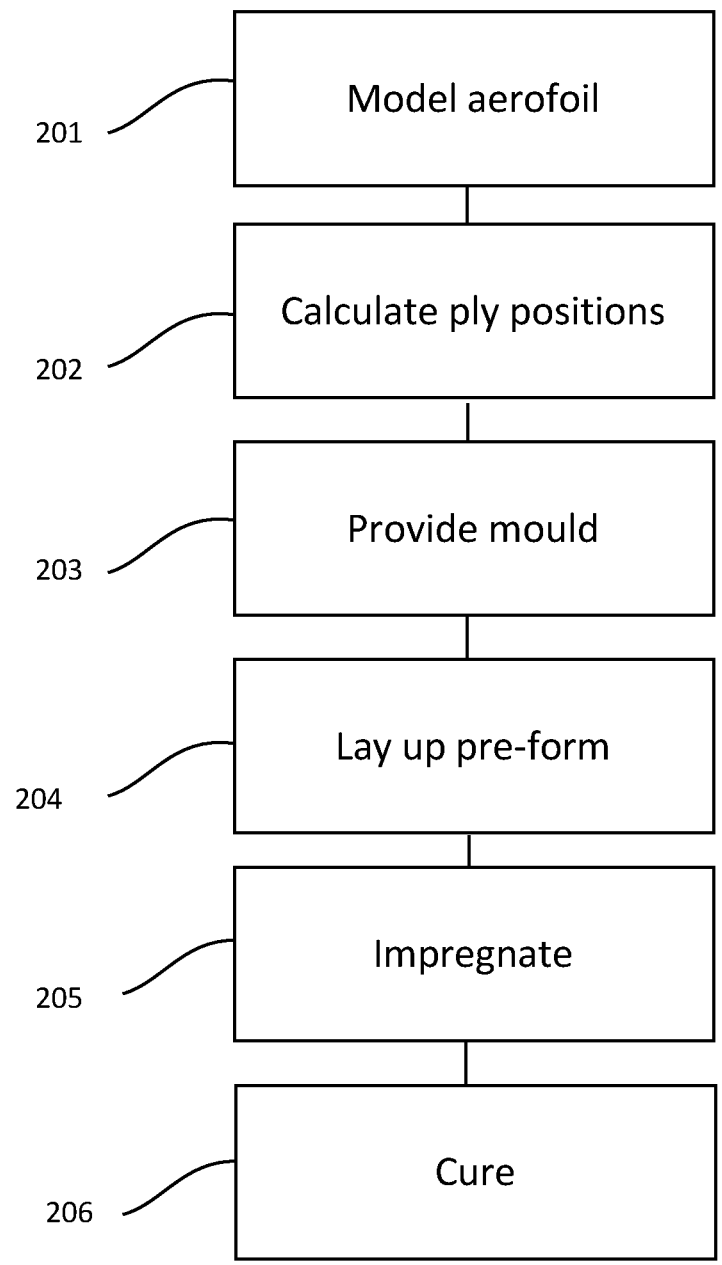
FIG. 7 shows a method of manufacturing the upper and lower covers.

A method of manufacturing the lower cover 140 will now be described with reference to FIG. 7. The upper cover 130 may be manufactured by a similar method.

In a first step 201, the aerofoil incorporating the covers is modelled using a suitable CAD software package so as to determine a desired shape of the finished covers.

Once the aerofoil, including the covers, has been modelled, a series of desired ply positions are calculated during step 202. The series of desired ply positions are determined for obtaining preforms with shape corresponding to a near-net shape of the covers modelled in step 201. In this manner, it is possible to lay-up and cure each cover with contact surfaces of complementary shape in a single process without the need for any further post-curing machining operations.

As has been specified previously, in the illustrated embodiments, the preform of plies are laid up as dry-fibre plies. However, in other embodiments, the plurality of plies may alternatively comprise pre-preg.

Figure 8A:
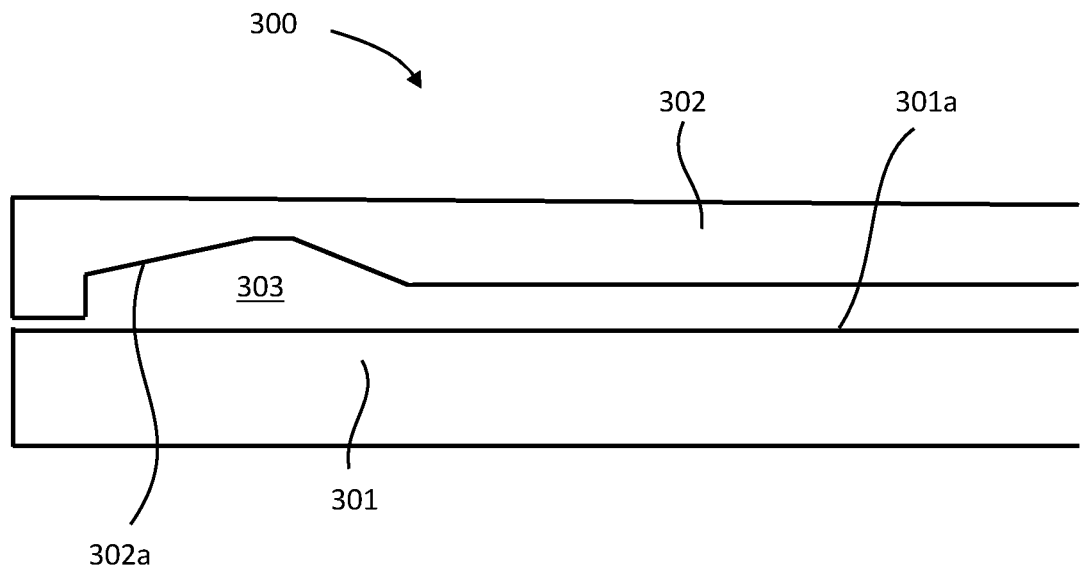
FIG. 8A shows a cover mould for manufacturing the lower and/or upper covers.
Figure 8B:
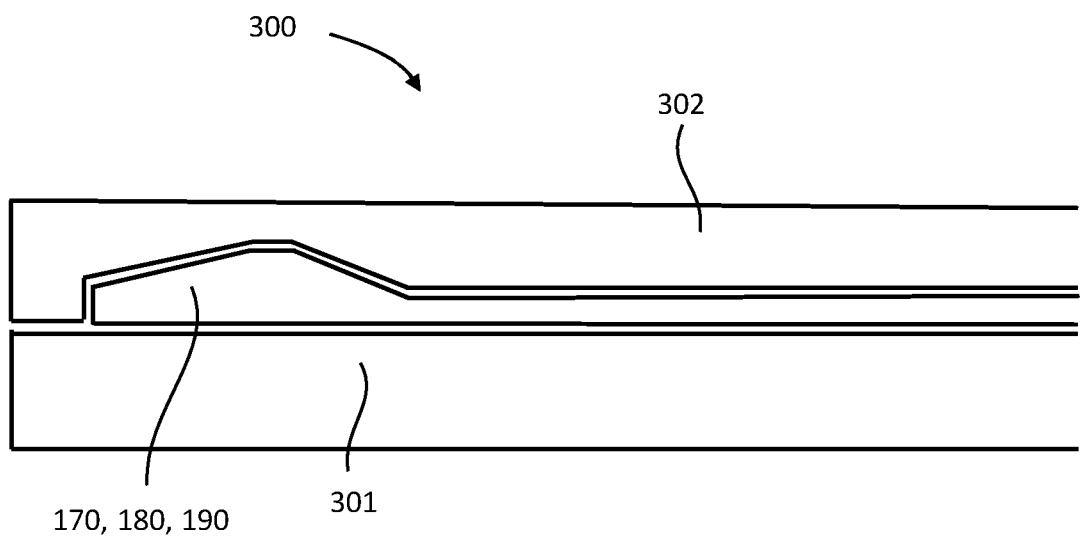
FIG. 8B shows the cover mould of FIG. 8A with a cover preform located within the cavity of the mould.

A first cover mould is provided at step 203 having a mould shape corresponding to a near-net shape of the lower cover 140 modelled during step 201. An exemplary first cover mould 300 is shown in FIG. 8A. The mould 300 features a tool bed 301 having an upper surface 301a for supporting the preform 170, 180, 190 and a corresponding upper mould 302 having a mould surface 302a. The upper surface 301a is typically a curved surface, with the level of curvature corresponding to the desired curvature of the cover. In the illustrated embodiment, the upper mould 302 is a female mould comprising an internal cavity 303 having a shape corresponding to a near-net shape of the lower cover 140 modelled during step 201. As can be seen in FIG. 8B, the internal cavity 303 is shaped such that the mould surface 302a of the upper mould 302 is in contact with the skin region of the cover preform and also in contact with the ramp of decreasing thickness at the interface region of the cover preform 170, 180, 190 during the curing step. In the illustrated embodiment, the mould surface 302a of the upper mould 302 is also in contact with the ramp of increasing thickness and the apex of the cover preform during the curing step, although it will be appreciated that this may not be the case for embodiments which do not feature a ramp of increasing thickness at the interface region. The cover mould 300 is typically provided as a closed RTM mould made of a suitable grade of tool steel, although it will be appreciated that in some embodiments, other mould types may be used.

Furthermore, it will also be appreciated that whilst in the illustrated embodiment step 203 takes place after step 202, in other embodiments step 203 may take place before step 202 or steps 202 and 203 may be performed at the same time.

Once the cover mould 300 has been provided and the desired ply positions have been determined, at step 204 a plurality of plies are laid up in the cover mould in the positions determined during step 202, to provide a preform 170, 180, 190 as shown in FIG. 8B with a shape corresponding to a near-net shape of the lower cover 140 modelled in step 201.

Consequently, a preform 170, 180, 190 is provided having a preform trailing edge (for instance 142a, 193), an interface region (for instance plies 170a-g) provided at the preform trailing edge, which provides the contact surface 143, 197 in the finished cover for abutting with the upper cover, and a skin region (for instance plies 170h-j or plies 180g-i) which defines the skin region 146 in the finished aerofoil.

The plies are laid-up such that the skin region of the preform 170, 180, 190 transitions into the relatively thicker interface region via a first ramp (for instance ramp 145a or 195) which is formed by laying-up an increased number of fibre plies at the interface region in a staggered arrangement.

As such, since a greater number of plies are laid-up at the interface region of the preform, the interface region has a thickness which increases in the chord-wise direction. In other words, the interface region of the preform is relatively thicker than the skin region.

The plies are also laid-up such that the interface region of the preform 170, 180, 190 transitions to a preform trailing edge (for instance 142a or 195) of the cover preform via a second ramp. As with the formation of the first ramp, the second ramp is formed by terminating the plies 170a-g or 180a-f in a staggered arrangement. The interface region of the preform is relative thicker than the preform trailing edge.

Furthermore, the lay-up of the preform is also controlled such that, in the finished cover 140, the contact surface provided by the ramp 143 has a complimentary shape to that of the contact surface of the upper cover 130 to ensure that the two contact surfaces can form a substantially flush abutment on assembly of the aerofoil.

This enables the finished lower cover 140 to be joined to the upper cover 130 after it has been cured, without requiring any additional machining or joining operations. As such, manufacturing efficiency and throughput is improved as a result.

As shown in FIG. 4D, the preform 190 may be laid up with at least one cover ply 192 which extends continuously in a chord-wise direction from the skin region over the first and second ramps to the preform trailing edge 193.

Whilst in the illustrated embodiment the plies are laid up within a mould 300, it will be appreciated that in other embodiments, the plies may be laid up outside the mould (e.g. on a lay-up table) before being transferred into the mould prior to the curing process.

The cover preform is then impregnated with a matrix material in step 205 and cured in step 206, typically using a Resin Transfer Moulding (RTM) process, in order to obtain the finished cover.

During the RTM process, matrix material is injected into the mould, which allows it to infuse throughout the preform. As the matrix material is injected into the mould, hydraulic pressure is applied to the preform which causes the preform to urge against the rigid surfaces of the mould. In some embodiments, additional pressure may also be applied to the preform via the mould.

Once the preform has been fully infused with matrix material, the mould is heated to cure the composite cover. Advantageously, the provision of a closed RTM mould enables the method to achieve a cover with a high quality surface finish on each side. However, it will be appreciated that in other embodiments, other suitable methods may be used.

The preform is cured in contact with a mould 300 during the curing step, the mould contacting the ramp of decreasing thickness during the curing step. The mould surface 302a contacting the ramp of decreasing thickness is made from a rigid material (typically a metal such as steel or Invar) rather than a flexible material such as a vacuum bag. This enables a high quality surface finish for the contact surface, which therefore does not require further machining.

Preferably the preform 170, 180, 190 is cured in a closed mould 300 during the curing step, the closed mould contacting the ramp of decreasing thickness during the curing step.

Once the lower cover 140 has been cured, the contact surface of the lower cover 140 is engaged with the corresponding contact surface of the upper cover 130 to assemble the trailing edge interface. Holes are then drilled through the contact surface of the lower cover, through the thickness of the lower cover, through the contact surface of the upper cover and through the thickness of the upper cover to form through-holes for receiving the fasteners 160, 199, 299. The through-holes are distributed along the spanwise length of the trailing edge.

The fasteners 160, 199, 299 can then be located and secured in the through-holes to join the upper and lower covers together, thereby forming the trailing edge of the aerofoil as shown in FIGS. 2, 5 and 6B for example, although (as has been specified previously) in other embodiments the upper and lower covers may be joined by applying an adhesive to one or both of the abutting contact surfaces.

In the illustrated embodiment, the plies laid up in step 204 are dry carbon fibre plies, and during step 205 the dry carbon fibre plies are impregnated with an epoxy resin. In other embodiments, other fibre and matrix types, such as glass or aramid fibres, may be used. It will also be appreciated that in embodiments in which pre-preg plies are used, the plies will have been pre-impregnated with a matrix material (such as epoxy resin) and hence the impregnating step 205 of the method may be omitted.

In the lay-up step 204, the fibre plies may be laid up manually, one-by-one, as complete plies. Alternatively, in the lay-up step 204, the fibre plies may be laid up by an automated laying machine which builds up the plies on a tool by placement of tapes or tows of dry-fibre or prepreg material.

A method of manufacturing the lower cover 140 has been described above in detail with reference to FIGS. 7, 8A and 8B. The upper cover 130 may be manufactured by a similar method, using a second preform (not shown) and a second cover mould (not shown) having a mould shape corresponding to a near-net shape of the upper cover 130. This process may be substantially identical to the process of manufacturing the lower cover 140, so will not be described in detail again.

In the embodiment of FIG. 6B, each cover 130, 140 is formed by: a respective lay-up step in which a plurality of fibre plies are laid up to obtain a respective preform, wherein the preform has a thickness and a preform trailing edge. Each preform is laid up during the lay-up step with a respective skin region and a respective interface region, the interface region comprising a ramp of increasing thickness where the thickness of the preform increases towards the preform trailing edge, a ramp of decreasing thickness where the thickness of the preform decreases towards the preform trailing edge and an apex between the ramp of increasing thickness and the ramp of decreasing thickness.

The first and second preforms are cured to form the first and second covers, the ramps of decreasing thickness curing to form respective contact surfaces of the first and second covers. The first and second preforms may be cured in respective cover moulds, either at the same time or at different times.

In the illustrated embodiments, the aircraft aerofoil is a winglet. However, it will be appreciated that in other embodiments, the aircraft aerofoil may be another aircraft aerofoil such as a wing, a flap, a spoiler or a horizontal tail plane.

Where the word 'or' appears this is to be construed to mean 'and/or' such that items referred to are not necessarily mutually exclusive and may be used in any appropriate combination.

Although the invention has been described above with reference to one or more preferred embodiments, it will be

The invention claimed is:

1. A method of manufacturing an aircraft aerofoil, the aircraft aerofoil comprising: a first cover, a second cover, an aerofoil leading edge, and an aerofoil trailing edge where the first cover and the second cover are joined at a trailing edge interface, the method comprising:
forming the first cover by:
a lay-up step in which a plurality of fiber plies are laid up to obtain a preform, wherein the preform is laid up during the lay-up step with a ramp of decreasing thickness where the decreasing thickness of the preform decreases towards the preform trailing edge, wherein a thickness of at least a portion of the ramp is greater than a thickness of the preform adjacent the ramp; and
a curing step in which the preform is cured to form the first cover, wherein the ramp of decreasing thickness cures during the curing step to form a contact surface of the first cover and wherein, while the preform is cured in contact with a mold during the curing step such that the mold is in contact with the ramp of decreasing thickness;
after the curing step, assembling the trailing edge interface by engaging the contact surface of the first cover with a contact surface of the second cover; and
joining the second cover to the first cover at the trailing edge interface.

2. The method according to claim 1, wherein the fiber plies are terminated in a staggered fashion at the ramp of decreasing thickness.

3. The method according to claim 1, wherein the ramp of decreasing thickness comprises a stack of the fiber plies, and a cover fiber ply which covers the stack of the fiber plies and cures, during the curing step, to form the contact surface of the first cover.

4. The method according to claim 3, wherein the cover ply extends to the preform trailing edge.

5. The method according to claim 1, wherein the preform is laid up in the lay-up step with a skin region and an interface region comprising:
a second ramp of increasing thickness where the thickness of the preform increases towards the first cover trailing edge;
the ramp of decreasing thickness where the thickness of the preform decreases towards the first cover trailing edge; and
an apex between the second ramp of increasing thickness and the first ramp of decreasing thickness, wherein the apex has a thickness greater than the skin region.

6. The method according to claim 1, wherein the joining step comprises inserting a fastener through the contact surfaces of the first and second covers.

7. The method according to claim 1, wherein the aircraft aerofoil is a winglet.

8. The method according to claim 1, wherein the plurality of fiber plies are dry-fiber plies; and the method further comprises, between the lay-up step and the curing step, an impregnating step in which the dry-fiber plies are impregnated with a matrix.

9. The method according to claim 1, wherein the first cover is a lower cover and the second cover is an upper cover.

10. The method according to claim 1, the method further comprising:
forming the second cover by:
a second lay-up step in which a plurality of fiber plies are laid up to obtain a second preform, wherein the second preform has a thickness and a second preform trailing edge, and the second preform is laid up during the second lay-up step with a second ramp of decreasing thickness where the thickness of the second preform decreases towards the second preform trailing edge; and
a second curing step in which the second preform is cured to form the second cover, wherein the second ramp of decreasing thickness cures during the second curing step to form the contact surface of the second cover.

11. The method according to claim 10, wherein the second preform is cured in contact with a second mold during the second curing step, and
the method further comprises the second mold contacting the second ramp of decreasing thickness during the second curing step.

12. The method according to claim 10, wherein the second preform is laid up in the second lay-up step with a skin region and a second interface region, the second interface region comprising:
a second ramp of increasing thickness where the thickness of the second preform increases towards the second preform trailing edge;
the second ramp of decreasing thickness where the thickness of the second preform decreases towards the second preform trailing edge; and
an apex between the second ramp of increasing thickness and the second ramp of decreasing thickness.

13. A method of manufacturing an aircraft aerofoil, the aircraft aerofoil comprising: a first cover, a second cover, an aerofoil leading edge, and an aerofoil trailing edge where the first cover and the second cover are joined at a trailing edge interface, the method comprising:
forming the first cover by:
a lay-up step in which a plurality of fiber plies are laid up to obtain a first preform, wherein the first preform has a thickness and a first preform trailing edge, and the first preform is laid up during the lay-up step with a skin region and a first interface region, the first interface region includes a first ramp of increasing thickness where the thickness of the first preform increases towards the first preform trailing edge, a second ramp of decreasing thickness where the thickness of the first preform decreases towards the first preform trailing edge and an apex between the first ramp of increasing thickness and the first-second ramp of decreasing thickness, wherein a thickness of the apex of the first ramp is greater than a thickness of the first preform adjacent the first interface region;
forming the second cover by:
a lay-up step in which a plurality of fiber plies are laid up to obtain a second preform, wherein the second preform has a thickness and a second preform trailing edge, and the second preform is laid up during the lay-up step with a skin region and a second interface region, the second interface region includes a third ramp of increasing thickness where the thickness of the second preform increases towards the second cover trailing edge, a fourth ramp of decreasing thickness where the thickness of the second preform decreases towards the second preform trailing edge and an apex between the third ramp of increasing thickness and the fourth ramp of decreasing thickness;

curing wherein the first preform to form the first cover and curing the second preform to form the second cover, wherein curing the ramps of decreasing thickness form respective contact surfaces of the first cover and the second cover, after the curing, assembling the trailing edge interface by engaging the contact surface of the first cover with the contact surface of the second cover; and joining the second cover to the first cover at the trailing edge interface.

\* \* \* \* \*